June 23, 1936.  S. J. ERLING  2,045,454
COMBINATION PNEUMATIC PULSATOR AND MILK CLAW
Filed Feb. 23, 1934
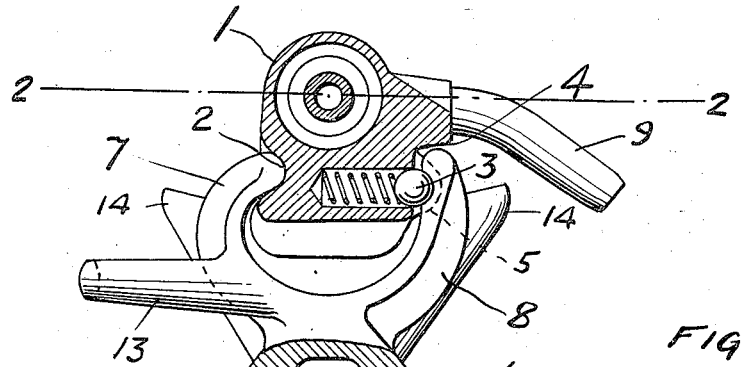
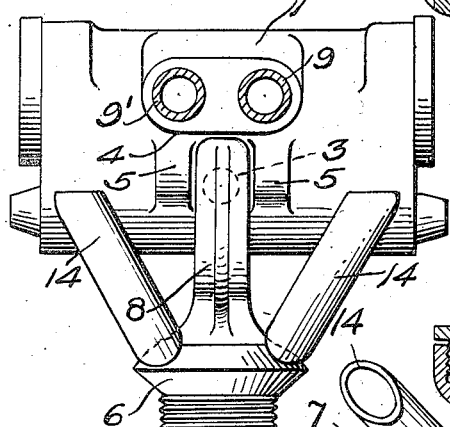
INVENTOR
Sven Johan Erling
BY
Busser and Harding
ATTORNEYS.
WITNESS:

Patented June 23, 1936

2,045,454

UNITED STATES PATENT OFFICE 2,045,454

COMBINATION PNEUMATIC PULSATOR AND MILK CLAW

Sven Johan Erling, Nockeby, Sweden, assignor to The De Laval Separator Company, New York, N. Y., a corporation of New Jersey Application February 23, 1934, Serial No. 712,666
In Sweden February 23, 1933

4 Claims. (Cl. 31—63)

The invention relates to clusters or claws of milking machines and particularly to that type adapted for use with teat cups each provided with two chambers, namely: an inner chamber adapted to receive the teat and which is connected, through the milk chamber of the cluster, with an ultimate milk receiver, and an outer or inflation chamber which receives pneumatic pulsations (atmospheric and partial vacuum) produced or controlled by the operation of a valve in the valve chamber of the cluster.

It is known to provide means whereby the milk member of the cluster may be removably secured to the valve member of the cluster, for an illustration of which see the Leitch Patent No. 1,255,186. The objects of the present invention are: to provide an improved means for detachably securing together the milk member and pulsation member of the claw or cluster; to adapt the claw or cluster to be placed in such position relative to the teats and teat cups that the pneumatic pulsations may alternate between the right pair and left pair of teats, instead of, as heretofore, between the front pair and rear pair of teats; and to effect a more favorable distribution of the weight.

In the drawing, which shows a preferred embodiment of the invention—

Fig. 1 is a vertical sectional view of the cluster taken on the line 1—1 of Fig. 2.

Fig. 2 is a sectional plan view of the cluster taken on the line 2—2 of Fig. 1.

Fig. 3 is a side elevation of the cluster.

Fig. 4 is a side view of the cluster looking in a direction at right angles to Figs. 1 and 3.

The pulsator member 1 of the cluster has on one side a recess 2, and on its other side, at a slightly lower level, an elastic or adjustable lock mechanism 3, preferably the spring pressed latch shown, and above the latter a shoulder 4. On opposite sides of the lock mechanism 3 are projections 5.

The milk collecting tubular vessel 6 is provided with two claw-shaped holders 7 and 8 which, preferably but not necessarily, are rigid with the vessel 6 and which are adapted to engage respectively the recess 2 and the lock mechanism 3. Holder 8 extends between projections 5 and abuts against shoulder 4.

The lock mechanism 3 should be positioned on that side of the cluster—the front side—from which the pulsation tube 9, the vacuum tube 9' and the milk tube 10 extend to the milking machine. The forces from these tubes assist in maintaining the parts in their connected relation. The tube nipples 14, 14, for connection to the teat cups, extend obliquely upward from the tubular milk vessel 6.

The milk collecting vessel 6 is provided with a nipple 11, which is held in place by the nut 12. To this nipple is connected the milk hose 10 leading to the milk receiver of the milking machine. The nipple 11 is bent at an angle not over 75° to a vertical line in order to obtain a favorable distribution of the weight.

Projecting from the milk collecting vessel 6 is a loop 13 by means of which the cluster may be suspended from the milking machine.

A cluster or claw constructed as described is especially adapted to be placed in such position relative to the teats and teat cups that the teats of each side shall be massaged simultaneously and the teats of opposite sides alternately, as contrasted with the present method of simultaneously massaging the front teats and alternately therewith simultaneously massaging the rear teats. The teats of a cow communicate intimately in longitudinal direction, but, on the other hand, the right half and the left half of the udder are independent of each other, and physiologically, the described new method of conveying pulsations is, from theoretical and practical standpoints, the better method.

The described means for locking or latching together the two members of the claw or cluster is one that requires no high degree of accuracy. By thus introducing greater tolerance the manufacturing costs have been considerably reduced.

What I claim and desire to protect by Letters Patent is:

1. A milking machine cluster comprising a member having a milk receiving and discharging chamber and nipples extending obliquely upward therefrom, a separate pneumatic pulsator member provided on one side with a recess, a locking device on the other side of the pulsator member, projections on the pulsator member on opposite sides of the locking device, and holder arms carried by the milk member, one of said arms engageable with said recess and the other of said arms adapted to extend between said projections and engage said locking device.

2. A milking machine cluster comprising a member having a milk receiving and discharging chamber and nipples extending obliquely upward therefrom, a separate pneumatic pulsator member provided on one side with a recess, a locking device on the other side of the pulsator member, projections on the pulsator member on opposite sides of the locking device, a shoulder on the pulsator member above the locking device, and holder arms carried by the milk member one of which is engageable with said recess and the other of which is adapted to extend between said projections and abut against said shoulder and engage said locking device.

3. A milking machine cluster comprising a member having a milk receiving and discharging chamber and nipples extending obliquely upward therefrom, a separate pneumatic pulsator member, a holding device carried by the milk member and adapted to receive the pulsator member, and a spring-pressed latch carried by the pulsator member adapted, in the seating of the pulsator member in the holding device, to snap into locking engagement with the holding device.

4. A milking machine cluster comprising a member having a milk receiving and discharging chamber and nipples extending obliquely upward therefrom, a separate pneumatic pulsator member, a vacuum tube and a pulsation tube extending from one side of the pulsator member, a holding device carried by the milk member and comprising arms rigid with and extending upward from opposite sides of the milking member and adapted to receive between them the pulsator member, and locking means carried by the pulsator and positioned on the side thereof from which said tubes extend and adapted to interlock with one arm of the holding device.

SVEN JOHAN ERLING.